Jan. 21, 1936.  C. F. REIS  2,028,411
LAMINATED STRUCTURE
Filed June 25, 1934  2 Sheets-Sheet 1
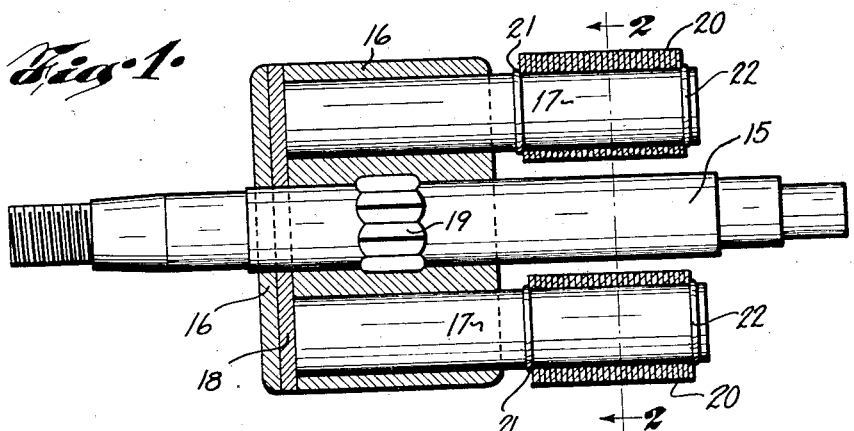
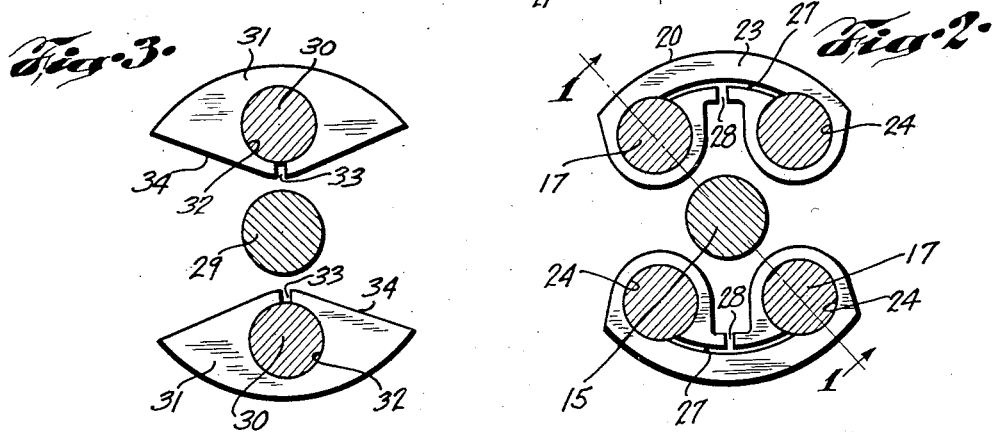
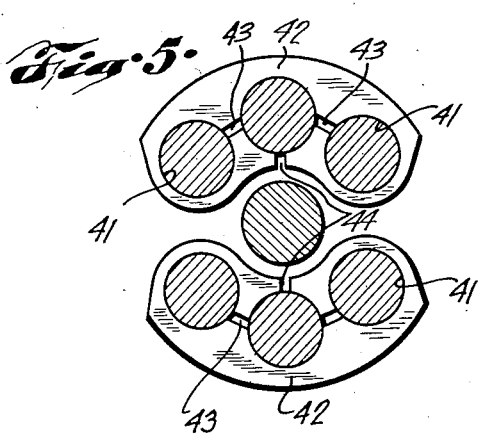
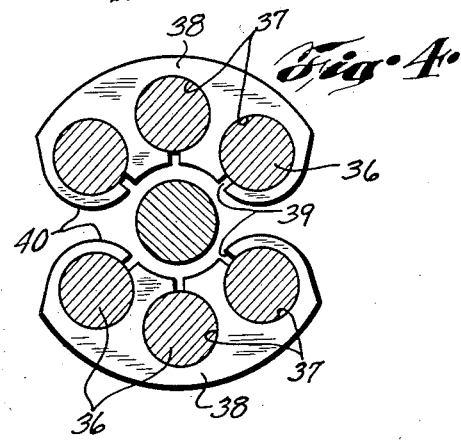
INVENTOR.
CURT F. REIS
BY Roy M Sikes
ATTORNEY.

Jan. 21, 1936.   C. F. REIS   2,028,411
LAMINATED STRUCTURE
Filed June 25, 1934   2 Sheets-Sheet 2
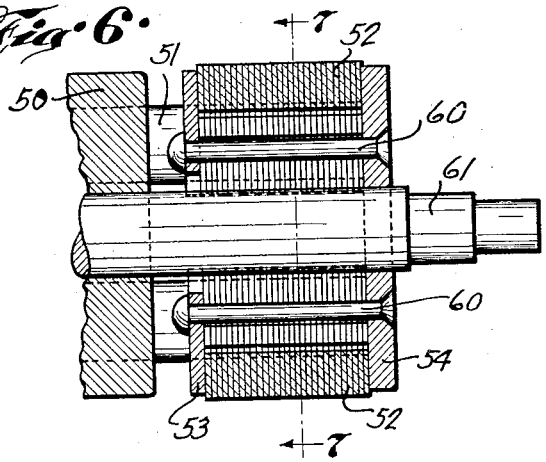
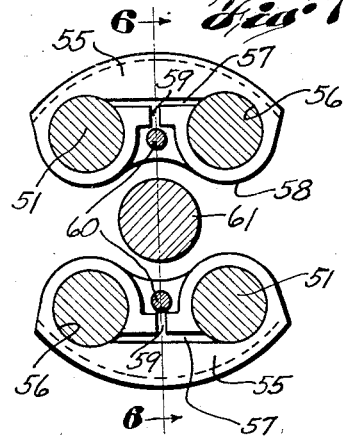
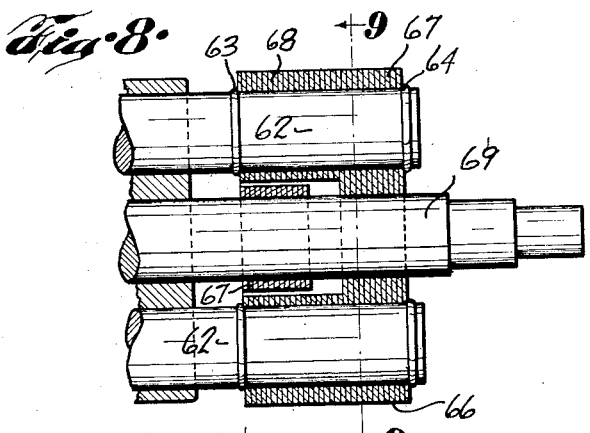
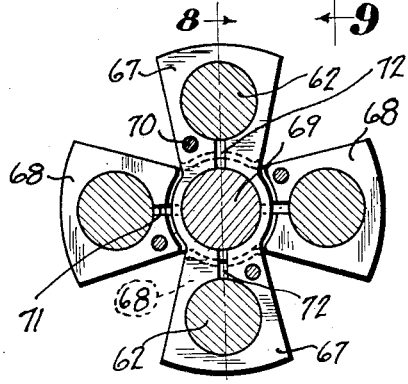
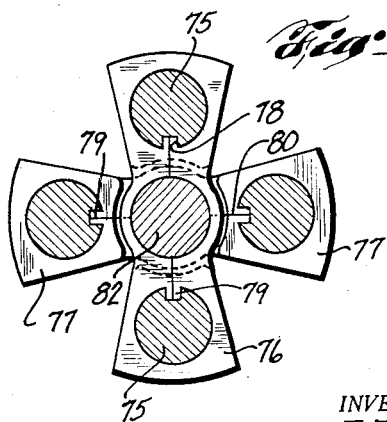
INVENTOR.
CURT F. REIS
BY
Roy M Eiler
ATTORNEY.

Patented Jan. 21, 1936

2,028,411

UNITED STATES PATENT OFFICE 2,028,411

LAMINATED STRUCTURE

Curt F. Reis, Beloit, Wis., assignor to Fairbanks, Morse & Company, Chicago, Ill., a corporation of Illinois Application June 25, 1934, Serial No. 732,296

13 Claims. (Cl. 171—252)

This invention relates to improvements in laminated structures, and more particularly to improvements in laminated pole-shoe assemblies for use in rotors of magnetos of the rotating field type.

In the construction of a magneto rotor embodying permanent bar magnets, it is the prevailing practice to interconnect the bars of like polarity, usually near their corresponding free ends, and near one end of the rotor, by pole-shoes of laminated construction. According to this practice the laminations are apertured as by drilling or punching, and stacked over the magnet bars to form pole shoes. The practice has been to form the openings of a sectional area approximating that of the bars to be received thereby. If the openings are of sufficient size to permit free insertion of the laminations over the ends of the magnet bars, some extraneous means must be provided in order to position the shoes tightly to the bars. The improvements resulting in the present invention have as their general objective, a rotor construction in which a tight fit is assured between the laminations and the bars, and in which the difficulty of, and time required for the assembly of the laminations to the bars is minimized, and the necessity for any extraneous pole-shoe-securing means is obviated.

Yet another object of the invention consists in the provision of apertured laminated shoes for a magneto rotor of the type noted, and the laminations of which are susceptible of a certain slight deformation which facilitates their assembly and aids in their securement to the bars.

Yet another object of the invention is structurally attained in the provision of pole-shoe laminations for a rotor of the general type noted, and which are provided with apertures to receive the ends of the magnet bars, the apertures being extended in a direction away from the bar so as to facilitate a slight distortion and temporary enlargement of the bar openings upon stacking the laminations.

The foregoing and further objects will be apparent from the following detailed description considered in connection with the accompanying drawings of certain presently preferred embodiments.

In the drawings, Fig. 1 is a longitudinal or axial sectional elevation of a magneto rotor of the permanent magnet type to which one form of the invention is applied, Fig. 1 being taken along line 1—1 of Fig. 2, and Fig. 2 is a transverse section as taken along line 2—2 of Fig. 1, Figs. 1 and 2 showing a magneto rotor of a type employing four pole pieces or permanent bar magnets; Fig. 3 is a transverse section through the pole shoe assembly of a rotor employing only two magnet bars of opposite polarity; Figs. 4 and 5 are transverse sections through the pole shoe assemblies of rotors of the permanent magnet type in which six magnet bars or pole pieces are employed, the arrangement of bars being substantially the same in Figs. 4 and 5, these two views illustrating slightly differing forms of punchings constituting the laminations of the pole shoes; Fig. 6 is a fragmentary longitudinal sectional elevation through one end of a rotor of the permanent magnet type in which the laminations forming the pole shoes, are held in clamped relation as by the use of end plates and rivets, Fig. 6 being taken along a plane 6—6 of Fig. 7; Fig. 7 is a transverse section as viewed along line 7—7 of Fig. 6; Fig. 8 is a fragmentary sectional elevation through an end portion of a rotor of the permanent magnet type, in which the bar magnets of opposite polarity are arranged differently than as shown in Fig. 7 and preceding figures, and in which diametrically opposite pole pieces are of the same polarity and interconnected by laminations crossing the rotor shaft; Fig. 9 is a transverse section taken along line 9—9 of Fig. 8, and Fig. 10 is a transverse section similar to Fig. 9, utilizing an identical arrangement of pole pieces, but in which the laminations are of slightly modified construction.

Referring now by numerals of reference to the drawings, there is shown at 15 a magneto or rotor shaft suitably formed at its opposite ends for the reception respectively say of a gear and a distributor arm or the like. For convenience of representation, the shaft 15 is shown as carrying a body 16 formed preferably of a die-cast non-magnetic metal embracing, over a portion of their length, magnet bars 17. The bars 17 are preferably formed of a cobalt steel, or some other highly retentive magnetic material, and abut a base plate or bridging element 18 which is preferably held in close contact with the end faces of bars 17 by the body of cast metal 16, which also substantially surrounds this base plate.

In order to enhance the bond and union between the shaft 15 and the cast body 16, I prefer to provide a part of the shaft circumference with flutes or splines 19 which serve to form a definite structural interlocking connection between the cast body and the shaft, and to prevent any possibility of angular displacement of the magnets with respect to the shaft. My preference is to embrace the magnet bars 17 over a substantial portion of their length, by the body of cast metal 16, as shown by Fig. 1, and to interconnect or bridge the bars of like polarity by means of laminated pole-shoes, one form of such assembly being shown by Fig. 2. The pole shoes indicated generally at 20 are, according to Fig. 1, positioned along the bars and held in compressed relation as stacked, by means of resilient snap rings 21 at the inner ends of the shoes, and 22 at the outer ends thereof. Partly by reason of better accommodation of the rings, the bars 17 are circular in section as shown by Figs. 2 et seq. and are peripherally ground or cut to provide suitable grooves, at the locations indicated by the rings 21 and 22, for the reception of the rings. Accordingly, the arrangement is such as to avoid the necessity of any threaded elements for securing the laminated shoes to the bars, and at the same time there is avoided any extensive cutting or drilling of the very hard cobalt steel bars.

The shape of the individual laminations composing the shoes 20 best appears in Fig. 2, in which each lamination 23 interconnects a pair of the bars of like polarity. The paired eye portions are each provided with an individual aperture 24 for the reception of one of the bars. The paired openings 24 are, by preference and as shown by Fig. 2, interconnected by a bridging slot 27, the slot 27 extended across a neck portion of the lamination from each of the paired openings 24. Further, to facilitate a slight deformation of the openings 24 for ease in stacking, I prefer to connect the slot 27 by an opening 28 projecting therefrom to the adjacent outside margin of the punching. The shape and location of the slots, such as 27 and 28, are such as to permit the insertion of a spreading tool at the time of stacking.

In Fig. 3 I have shown an arrangement in which the form of rotor is, or may be, identical with that of Fig. 1, except that the shaft 29 serves to support, as through a body of cast metal, only a pair of pole pieces 30 of opposite polarity. In this construction each of the fan-shaped laminations forming the shoes 31 is characterized by only a single circular opening 32 connected as by a narrow slot 33 to the nearest outside margin 34.

There is an obvious advantage in substantially completely surrounding the magnet bars with the laminations. There is however a distinct disadvantage in stacking, and consequently an increased assembly expense due to forming the openings, such as 24 or 32, of a diameter the same as, or slightly less than, the corresponding bar diameter, unless slots such as 28 and 33 be provided to permit a certain deformation or stretch of the metal around the bars without impairing the magnetic and structural relation between the bars and shoes. The advantage, resulting from the slots or slits, prevails through the several modified structures illustrated and later to be described.

In each of Figs. 4 and 5 I have shown the invention as applied to a rotor embodying six magnet bars arranged in two groups of three each. In Fig. 4 bars 36 engage bar openings 37 in the laminations 38, and each of the openings 37 is connected as by a slot 39, to the nearest outside margin 40 of the lamination or punching. In Fig. 5, while the same arrangement of bars obtains as in Fig. 4, the apertures 41 in the laminations 42 are not all connected by slotted extensions thereof to the outside margin of the punchings, but the grouped openings 41 are bridged as by slots 43, and the central opening 41 is connected to the outer margin of the punching as by a slot 44.

In each of Figs. 1–5 it is contemplated that the several openings for the magnet bars be formed of a size not greater, and preferably just slightly less than the corresponding diameter of the bar to be received thereby, the provision of the slots enabling deformation of the punching and temporary enlargement of the opening sufficient to permit stacking. The slight necessary degree of resilience of the lamination or punching serves to secure the laminations and hence the shoes, in assembled position.

In Figs. 6 and 7 I have illustrated a modification in which there is utilized a body of metal 50, serving to carry four magnet bars or pole pieces 51, those of like polarity being bridged by pole shoes 52 embodying an inner end plate 53 and an outer end plate 54. The end plates correspond generally in shape to the laminations 55 forming the shoes, and which are of the same general shape as the punchings 23 of Fig. 2. Those shown in Fig. 7 are characterized by circular bar openings 56, a pair of which are interconnected by a slot 57. The slot 57 is connected to the adjacent outer margin 58 of the punching by a slot 59. While in all important respects the assembly of Figs. 6 and 7 is, or may be, the same as that of Figs. 1 and 2, the latter constructions employ in lieu of the snap rings 21—22, the end plates 53—54 bridged by rivets or the like 60, which serve to hold the laminations in compressed relation in position along the bars, and hence secured axially with respect to the rotor and shaft 61.

Figs. 8 and 9 illustrate a rotor embodying four magnet bars, in which the bars are alternately of opposite polarity and indicated at 62. Snap rings 63 and 64 may optionally be employed in this construction. The laminations forming the shoes 66 are, in the case of Figs. 8 and 9, of two kinds. In one shoe those near the inner end, such as 67, are provided with three apertures, these laminations extending diametrally of the rotor, and their apertures serving to receive the diametrally opposed bars 62 and shaft 69. The remainder of this shoe will be composed of laminations, such as 68, apertured to receive and engage only one of the bars 62. As to the other shoe, the longer or diametral laminations 67 are disposed near the outer end of the rotor assembly, while the shorter ones 68 extend therefrom to the ring 63 to complete the assembly of the shoe. Thus each pole shoe of the structure of Figs. 8 and 9 is longitudinally of U shape, the two shoes being nested, although spaced from each other and relatively inverted. In this construction four rivets 70 are preferably employed for securement of the laminations in compression and for the purpose of preventing any angular displacement of the shorter laminations with respect to the longer. Each of the laminations is provided with a slot extending from one or an outer bar opening to the adjacent margin of the punching in the case of the shorter laminations, and from the bar opening to the shaft opening in the case of the diametral laminations. The slotted openings are indicated respectively at 71 and 72.

Fig. 10 is a slight modification of the arrangement shown in Fig. 9, and may be considered as a section along line 9—9 of Fig. 8, except for the modification of the laminations and slight changes in the construction of the magnet bars. In Fig. 10 the magnet bars 75 are related as in Figs. 8 and 9, and the external shapes of the two types of laminations 76 and 77 correspond respectively to 67 and 68 of Fig. 9. According to Fig. 10, the bars 75 are longitudinally slotted over a portion of their length, as shown at 78. All of the laminations 76 and 77 are provided with tongues 79 projecting into and collectively substantially filling the slots 78. The laminations of Fig. 10 are further slit, as shown, or if preferred, may be slotted from the extremity of the tongue 78 to the outer margin in the case of laminations 77. The slots 80 in the case of laminations 76, extend to the opening through which extends the shaft 82. In the modification of Fig. 10 the engagement of the resilient tongues 79 with the slots 78 serves to prevent any angular displacement of even the shorter laminations 77 with respect to the bars, and the provision of slits 80 permits a desirable deformation of the laminations and particularly the apertured portions thereof for the purpose of stacking.

No attempt has been made in the course of the present description to exhaust the possible modifications and different embodiments of the invention. It will appear that those described by way of example fully attain each of the objects hereinabove enumerated, as well as others implied therefrom. Because of the possibility of further modification, the foregoing description is to be understood solely as exemplifying, and not as limiting the invention, the scope of which is to be determined in accordance with the appended claims.

I claim:

1. In a rotor for a magneto of the rotating field type, a shaft, a plurality of magnet bars, an assembly of laminations constituting pole shoes carried by the bars, the laminations being apertured, with the apertures receiving the ends of the bars, certain of the bar apertures each being extended in a direction away from the bar to form a slot.

2. In a rotor for a magneto of the rotating field type, a shaft, a plurality of magnet bars, an assembly of laminations stacked upon the bars and constituting pole shoes, the laminations being apertured, with the apertures receiving and substantially surrounding end portions of the bars, certain of the bar apertures being extended in a direction away from the bar, whereby to permit deflection of the apertured portion of each lamination upon stacking.

3. In a rotor for a magneto of the rotating field type, a shaft, a plurality of magnet bars, an assembly of laminations stacked upon the bars and constituting pole shoes, the laminations being apertured and receiving through their apertures, end portions of the bars, the material of each lamination being severed between certain of the bar apertures and the outer margin so as to permit deflection of the apertured portion of the laminations in stacking.

4. In a magneto rotor of the rotating field type, including a shaft and a plurality of magnet bars, pole shoes carried by the bars, each shoe consisting of an assembly of laminations, the laminations being apertured to receive, and being stacked over and substantially surrounding the ends of the bars, the laminations being characterized by internal and external margins, and certain of the bar apertures being extended to one of the margins.

5. In a magneto rotor, a shaft, a plurality of magnet bars, pole shoes of laminated construction carried by the bars, each of the shoe laminations being apertured to receive, and being stacked over the ends of the bars, each of the laminations being characterized by internal and external margins, and provided with a slit extending between certain of the bar apertures and margins.

6. In a magnet structure for magnetos, a plurality of magnet bars, an assembly of laminations constituting shoes carried by the bars, the laminations being apertured with the apertures receiving end portions of the bars, the laminations being further characterized by slots interconnecting certain of the bar apertures, whereby to permit deformation of the apertured portion of the lamination, to facilitate stacking over the bars.

7. A laminated pole shoe for assembly to bar magnets, consisting of a plurality of laminations each apertured so as substantially to surround at least a pair of the bars and characterized by a slit bridging at least a pair of the bar apertures.

8. A laminated pole shoe for assembly to at least a pair of bar magnets, and formed of a plurality of stacked laminations, each lamination being apertured to provide openings for the reception of the bars, the openings being arranged so that each bar is substantially surrounded by the lamination, each lamination being longitudinally apertured between the bar openings and provided with slots connecting at least certain of the bar apertures to the outer margin of the lamination.

9. A laminated pole shoe structure in combination with a plurality of bar magnets, each lamination of the pole shoe structure having a plurality of bar-receiving openings of a shape corresponding to the section of the bar engaged thereby, and of an area not exceeding the sectional area of the bar where engaged by the lamination, each of the bar openings extending substantially around the bar to be received thereby, and the bar openings each being provided with a slot-like extension.

10. In a magneto magnet assembly, a plurality of magnet bars of circular section, laminated pole shoes carried by the bars, each of the shoe laminations being characterized by circular bar openings of an area not exceeding the section of the bar where engaged by the lamination, each lamination being further characterized by an elongate aperture extended laterally of at least certain of its bar openings.

11. In combination in a bar magnet assembly for magnetos, pole shoes carried by the bars, and each consisting of a plurality of stacked laminations, the laminations of each shoe interconnecting at least a pair of the bars and provided with bar-receiving apertures, the bar-apertured portions being disposed in relatively enlarged spaced extremities of each lamination, the extremities being interconnected by a portion of relatively reduced sectional area, each lamination being further characterized by an aperture extending lengthwise of the lamination and interconnecting a pair of the bar apertures.

12. In combination in a bar magnet assembly for magnetos, pole shoes carried by the bars, and each consisting of a plurality of stacked laminations, the laminations of each shoe interconnecting at least a pair of the bars and provided with bar-receiving apertures, the bar-apertured portions being disposed in relatively enlarged spaced extremities of each lamination, the extremities being interconnected by a portion of relatively reduced sectional area, each lamination being further characterized by a longitudinal aperture interconnecting a pair of the bar apertures, and further provided with a slot connecting the longitudinal aperture to the adjacent outside margin of the lamination.

13. Laminations adapted for stacking to form a magneto pole shoe, each lamination consisting of an eye portion near each of its opposite ends, a bridge portion of relatively reduced dimension connecting the eye portions, each lamination being characterized by a substantially rectangular slot extending from each eye to an adjacent outer margin of the lamination.

CURT F. REIS.